United States Patent [19]

Ballyns et al.

[11] Patent Number: 4,940,380
[45] Date of Patent: Jul. 10, 1990

[54] LOAD ELEVATOR PLATFORM FOR TRUCK OR THE LIKE

[75] Inventors: Jan Ballyns, Pickering; John C. Martin; Paul H. Martin, Toronto, all of Canada

[73] Assignee: Diesel Equipment Limited, Toronto, Canada

[21] Appl. No.: 311,757

[22] Filed: Feb. 17, 1989

[51] Int. Cl.$^5$ .............................................. B60P 3/00
[52] U.S. Cl. ............................ 414/495; 108/51.1; 296/182; 105/422; 414/540
[58] Field of Search ............... 414/495, 545, 540, 546, 414/556, 557; 52/781, 772; 105/422; 296/182, 204; 280/785, 789; 108/51.1, 56.1, 56.3

[56] References Cited

U.S. PATENT DOCUMENTS

| 2,692,032 | 10/1954 | Peterson | 105/422 |
|---|---|---|---|
| 2,841,437 | 7/1958 | Turpin, Jr. | 296/182 |
| 2,926,928 | 3/1960 | Bennett | 296/182 |
| 3,275,170 | 9/1966 | MacRae et al. | 414/545 |
| 3,294,036 | 12/1966 | Van Moss, Jr. | 105/422 |
| 3,432,052 | 3/1969 | DeBusk | 414/540 |
| 3,626,869 | 12/1971 | Colas | 108/51.1 |
| 3,909,059 | 9/1975 | Benninger et al. | 296/182 |
| 4,787,669 | 11/1988 | Wante | 105/422 |

FOREIGN PATENT DOCUMENTS

| 514515 | 7/1955 | Canada | 296/182 |
|---|---|---|---|
| 2200600 | 8/1988 | United Kingdom | 296/182 |

*Primary Examiner*—Galen Barefoot
*Attorney, Agent, or Firm*—Fetherstonhaugh & Co.

[57] ABSTRACT

A light-weight elevator platform for a load elevator of a truck or the like has a plurality of light-weight floor boards mounted in a rectangular frame which has support rails which extend across the frame and are located between adjacent floor boards. Side edges of the floor boards are mounted in channels which are formed in the side edges of the frame and support rail members. The support rail members are releaseably secured to the frame member.

8 Claims, 5 Drawing Sheets

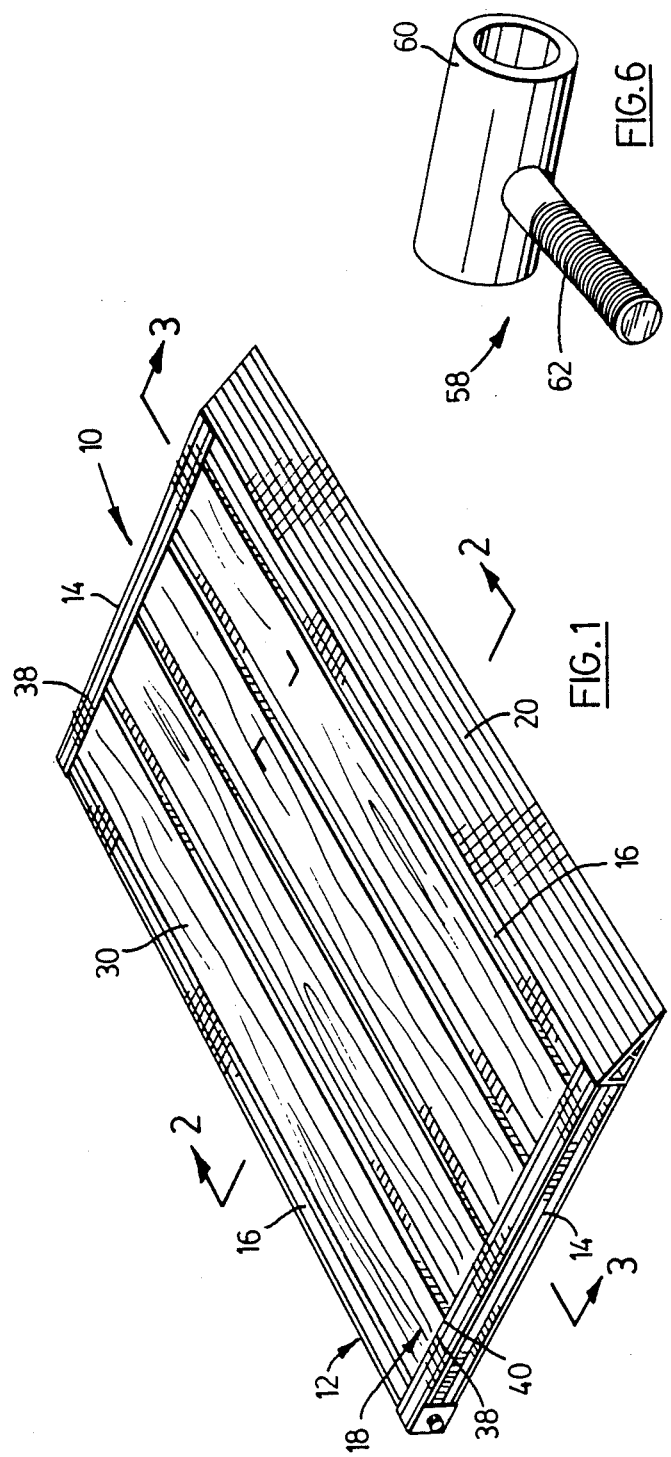

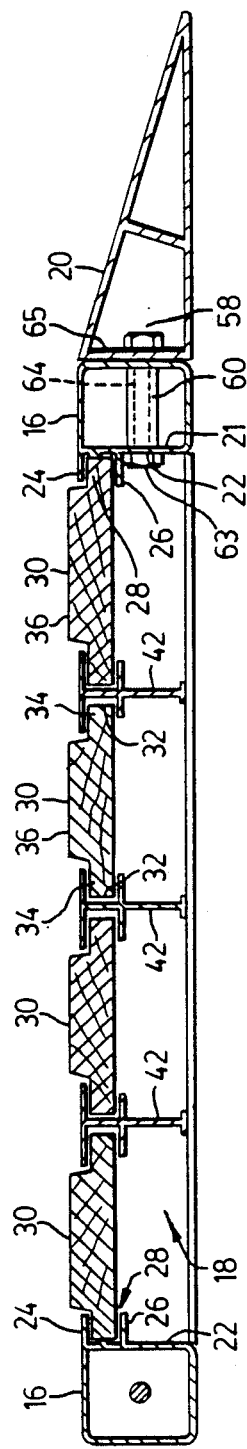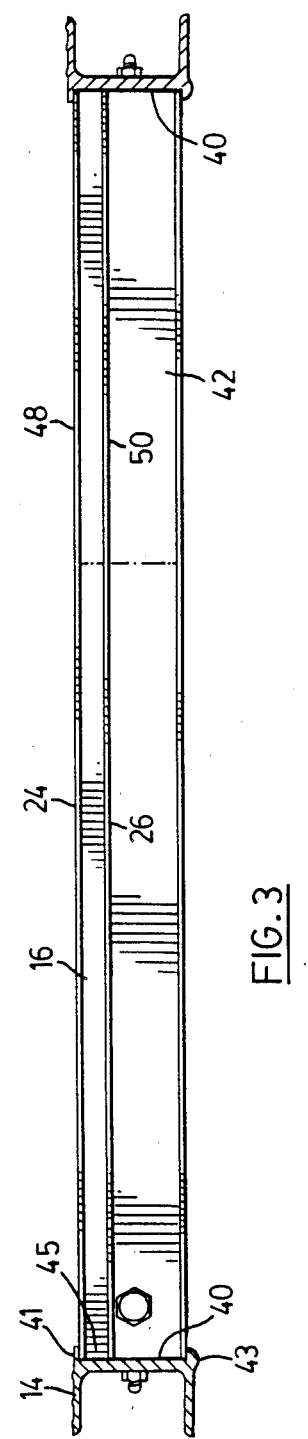

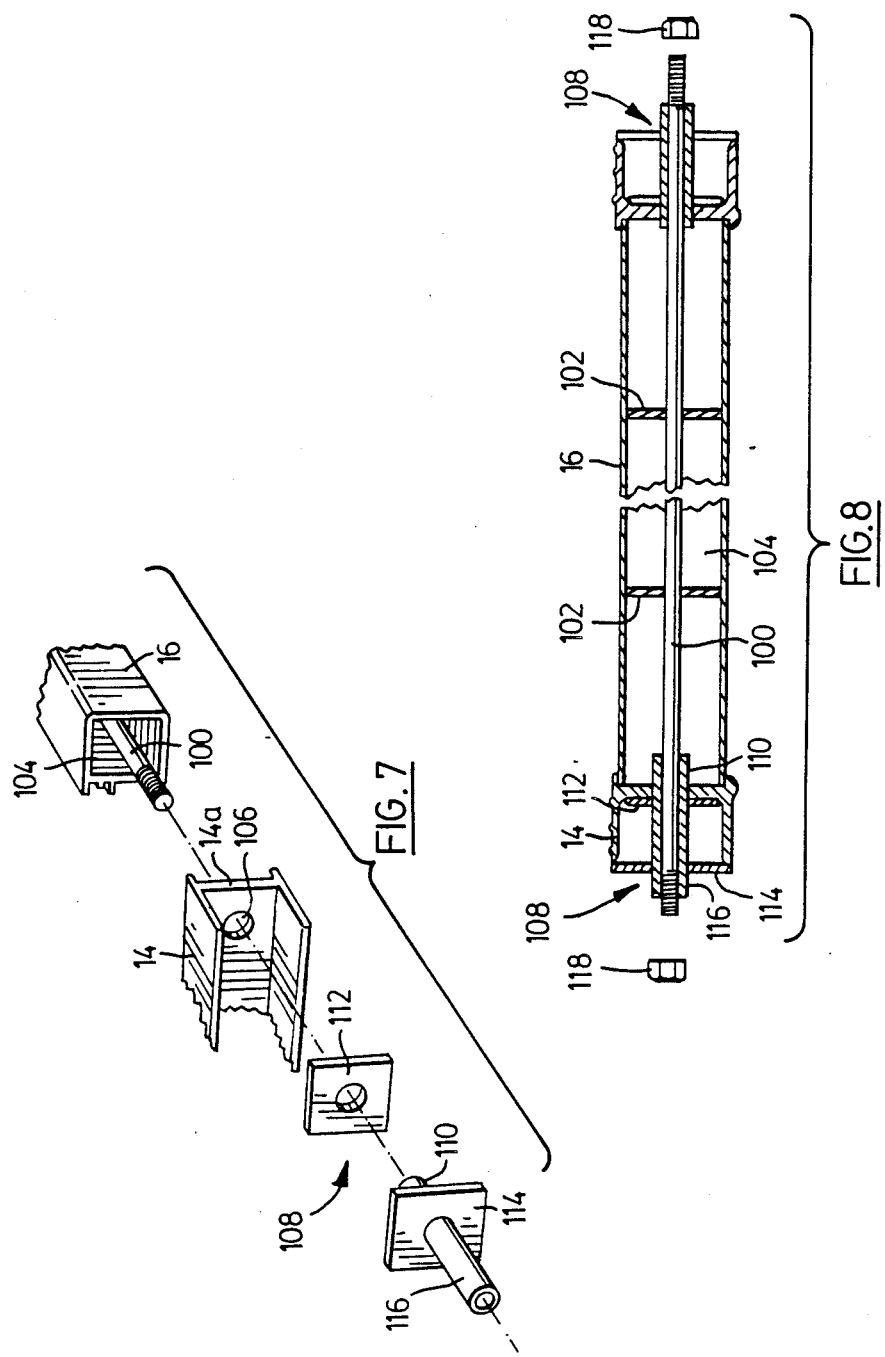

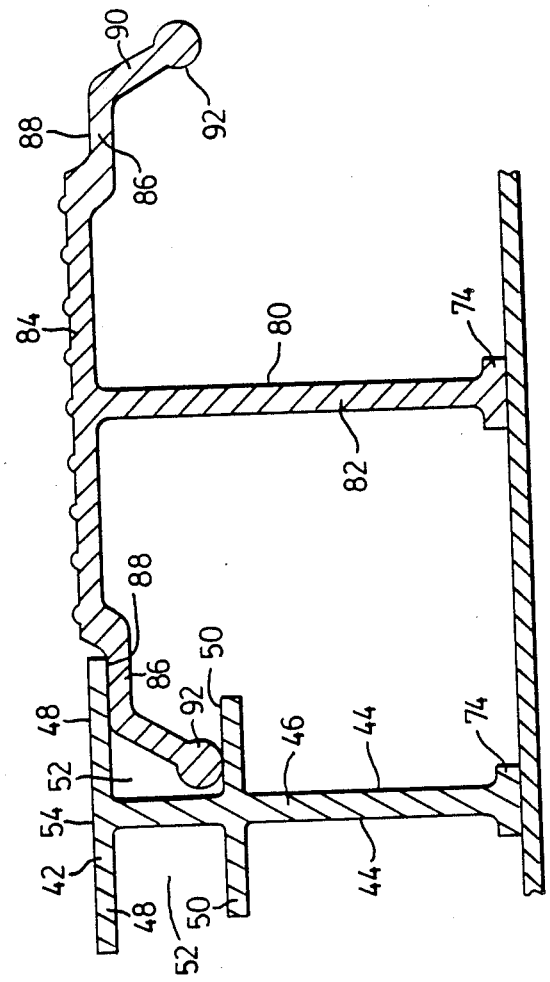

LOAD ELEVATOR PLATFORM FOR TRUCK OR THE LIKE

BACKGROUND OF INVENTION

This invention relates to improvements in a load elevator platform for a truck, van or the like.

Elevator platforms have been used for many years for the purposes of raising and lowering a load with respect to the floor of a truck. One such elevator platform is described in U.S. Pat. No. 3,275,170 dated Sept. 27, 1966 and assigned to Diesel Equipment Limited. In this prior patent, the load elevating platform is made from a heavy gauge sheet metal and is heavy in weight. This elevator platform requires a powerful elevating mechanism.

There are many applications where an elevator platform can be used to advantage on vehicles which are designed to carry relatively low-weight loads and in which it is desirable to minimize the weight of the platform in order to reduce the load applied to the vehicle by reason of the platform itself. If, for example, the platform is to be used on a small truck such as a pick-up truck, the weight of the platform could represent a substantial portion of the weight-carrying capacity of the vehicle.

It is an object of the present invention to provide a light-weight elevator platform for a load elevator mechanism for a truck or the like.

It is a further object of the present invention to provide a light-weight elevator platform which consists of a frame, a plurality of floor boards and a plurality of support rails which cooperate with one another and with the frame to support the floor boards.

SUMMARY OF INVENTION

According to one aspect of the present invention there is provided in a load elevator for raising and lowering a load with respect to the bed of a truck, the improvement of a light-weight elevator platform comprising a plurality of light-weight floor boards, each having oppositely disposed side edges and oppositely disposed ends, a frame having oppositely disposed first frame members and oppositely disposed second frame members connected to one another to define a rectangular-shaped floor board enclosure, said frame members each having a side face which is directed inwardly of the enclosure, a plurality of support rails each having oppositely disposed side faces and oppositely disposed ends, means for releaseably securing the ends of said support rails to the first frame member to releaseably retain the support rails in a position extending between the first frame members in a spaced parallel relationship to the second frame members, mounting means at said side face of each second frame member and at each side face of each support rail releaseably retaining a marginal side edge portion of one of the floor boards to support one floor board between each support rail and between the second frame members and an adjacent support rail.

BRIEF DESCRIPTION OF THE DRAWINGS

The invention will be more clearly understood after reference to the following detailed specification read in conjunction with the drawings wherein:

FIG. 1 is a pictorial view of a platform constructed in accordance with an embodiment of the present invention;

FIG. 2 is a sectional view of the platform of FIG. 1 taken along the line 2—2 of FIG. 1;

FIG. 3 is a sectional view taken along the line 3—3 of FIG. 1 with the floor board removed;

FIG. 6 is a pictorial view of the mounting bolt and sleeve of FIG. 4;

FIG. 7 is an exploded pictorial view of the combined securing and pivot mechanisms used to connect the frame members at the back end of the platform;

FIG. 8 is a sectional side view taken through the back frame member which illustrates the mechanism of FIG. 6 in an assembled configuration; and FIG. 9 is a cross-sectional view of a floor board constructed in accordance with a further embodiment of the present invention.

DESCRIPTION OF PREFERRED EMBODIMENT

Figure 4:
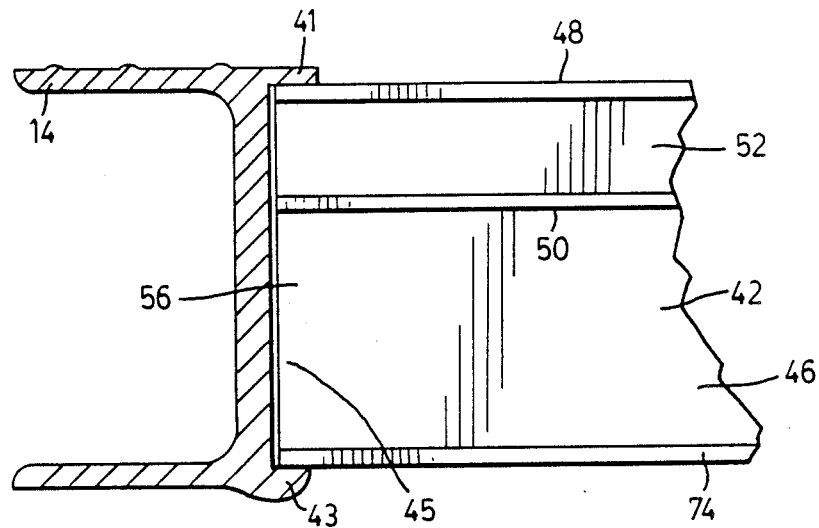
FIG. 4 is a sectional side view illustrating the manner in which the support rails are supported by the frame members.

With reference to FIG. 1 of the drawings, the reference numeral 10 refers generally to an elevator platform constructed in accordance with an embodiment of the present invention. The elevator 10 includes a frame which is generally identified by the reference numeral 12 which consists of oppositely disposed first frame members 14 and oppositely disposed second frame members 16 which are connected to one another and cooperate with one another to define a rectangular-shaped floor board enclosure 18. A ramp frame member 20 is attached to one of the second frame members 16, which forms the front frame member, by means of a nut and bolt assembly which is generally identified by the numeral 76. As shown in FIG. 3 of the drawings, the first frame members 14 are U-shaped channel members which have flanges 41 and 43 which project inwardly of the enclosure 18 from their inner side faces 40 to form a mounting channel 45 which is proportioned to receive an end of the supporting rails 42 and an end of the second frame member 16 in a close fitting relationship so as to support the support rails 42 and frame members 16 in use.

As shown in FIG. 2 of the drawings, the second frame members 16 each have a rectangular cross-sectional configuration and a side face 22 which is directed inwardly of the enclosure 18. Flanges 24 and 26 project laterally inwardly from the side faces 22 in a spaced relationship to form a mounting channel 28 therebetween.

A plurality of floor boards 30 are provided, each of which has oppositely disposed side edges 32 and marginal edge portions 34 which extend inwardly from the side edges 32 to a raised crown portion 36. The floor boards 30 also have oppositely disposed ends 38 arranged to butt against the inner side faces 40 of the first frame members 14.

A plurality of support rails 42 are provided for the purposes of supporting the floor boards. As shown in FIG. 8 of the drawings, each of the support rails 42 has a central rib portion 46 which has oppositely disposed side faces 44. Flanges 48 and 50 project outwardly from each side face 44 and serve to provide mounting channels 52 which as shown in FIG. 2 of the drawings, are proportioned to receive the marginal edge portions 34 of the floor boards in a close-fitting relationship with the crown portion 40 projecting above the upper face 54.

As shown in FIG. 4 of the drawings, the ends 56 of each support rail 42 are seated in the mounting channel 45 to the first frame members 14 in a close fitting relationship.

Figure 5:
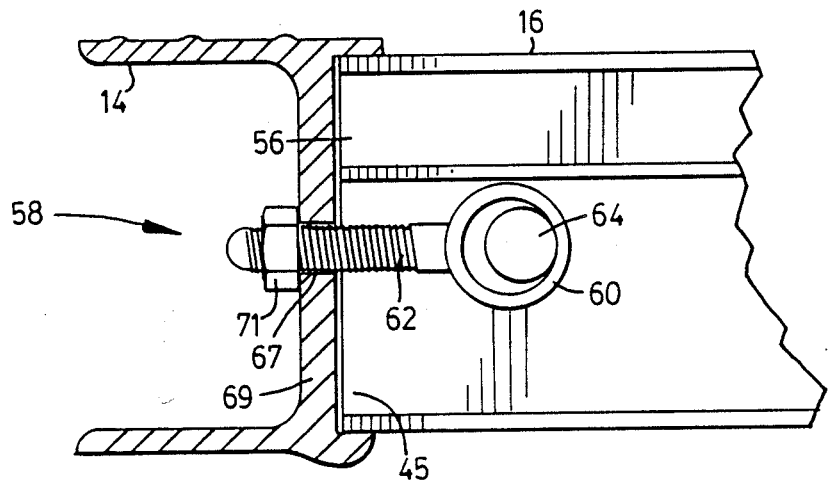
FIG. 5 is a sectional side view which illustrates the manner in which the ends of the frame members are attached to the frame members.

As shown in FIGS. 2 and 5 of the drawings, the first frame member 16 which forms the front frame member is seated in the mounting channel 56 of the first frame members 14 in a like manner to that in which the opposite ends of the support rails 42 are mounted. The frame member 16 is, however, also rigidly secured to the frame member 16 by means of a mounting bolt assembly which is generally identified by the reference numeral 58. As shown in FIG. 6, the mounting bolt assembly 58 includes a tubular sleeve 60 which has a threaded pin 62 projecting radially outwardly therefrom. A bolt 64 is threaded through the sleeve 60 and through passages formed in the end wall 65 of the ramp 20 and through the side wall 21 of the front frame member 16. The head of the bolt 64 bears against the wall 65 and a nut 63 is connected to the other end of the bolt 64 and bears against the side wall 21. This serves to clamp the ramp 20 to the front frame member 16 and it also serves to position the sleeve 60 so that the pin 62 (FIG. 5) extends through a passage 67 in the wall 69 of the frame member 14. A nut 71 is threadedly mounted on the end of the pin 62 and serves to secure the ends of the frame members 16 in the channel 45 of the frame members 14.

The second or back frame member 16 is also a releasable frame member which is releaseably attached to the first frame members 14 by mounting means of the type illustrated in FIGS. 7 and 8 of the drawings which also incorporated the pivot which is used to connect the platform to the elevator mechanism. The advantage to constructing the frame so that the frame members 16 can be detached is that this facilitates the mounting of the floor board 30 which is to be positioned with its marginal edge in the channel 28 of the detachable frame member 16 and it permits the platform to be assembled without the need to weld any of the components to one another.

As shown in FIGS. 7 and 8 of the drawings, a rod 100 which has centering plates 102 mounted thereon is positioned within the chamber 104 formed within the back frame member 16. A passage 106 is formed in the web 14a. A rod supporting assembly 108 is provided at each end of the rod. The rod supporting assembly 108 comprises a sleeve 110 which has first plate 112 and a second plate 114 welded thereto in a spaced parallel relationship. The plate 112 is proportioned to fit in a close fitting relationship within the channel formed in the frame members 14 as shown in FIG. 8. The inner end portion of the tubular member 110 extends through the passage 106 and the other end portion 116 projects outwardly from the plate 114 and serves to form the pivot pin on which the platform will pivot when attached to the elevator mechanism. Opposite ends of the rod 100 are threaded to receive mounting nuts 118 which serve to secure the frame members 14 to the frame member 16.

In the embodiments illustrated in FIGS. 1 to 8 of the drawings, the frame members 14 and 16 and the support rails 42 and the ramp 20 are preferably made for extruded aluminum. The floor boards 30 are preferably made from wood.

In the embodiment illustrated in FIG. 9 of the drawings, the floor board members 80 are made from extruded aluminum and include a stiffening rib portion 82 which extends downwardly from the centre of the width of the floor panel portion 84. The floor panel portion 84 has marginal edge portions 86 which are formed to provide a recessed shoulder 88 from which a flange 90 projects downwardly and outwardly to a rounded edge portion 92. The marginal edge portion 86 is proportioned to fit in a close-fitting relationship within the channel 52 of the support rail 46 and within the channel 28 of the second frame members 16 (FIG. 2).

The downwardly and outwardly inclined flange portions 90 will tend to be deflected outwardly under the influence of a load applied to the floor panel portion 84 and this will further serve to seat the floor board members 80 in the mounting channels of the support members and frame members.

The width of a typical elevator platform constructed in accordance with an embodiment of this invention may range from about 57" to 90" and the front to back depth from the outer side edges of the frame members 16 may measure from 24" to 36". The frame members 14 and 16 may have a depth of about 2" with the combined width of the upper flanges being about 1¼" and the combined width of the lower flanges 50 being about 1". The thickness of the central rib may be about 0.1" and the width of the lower end portion 74 may be about 0.3". The height of the mounting channel 52 and the mounting channel 28 may be about 1.3". The wooden floor boards may each measure about 4" in overall width and have a thickness of about 1¾".

It will be apparent from the foregoing that the various components of the frame may be prefabricated to form a kit which can be easily assembled and as a consequence, it is possible to ensure that each of the frame members has a length which is equal to the maximum dimension of any platform which might be required. When a platform smaller than the maximum size is required, it is then merely necessary to cut each of the frame members to the required length and to make corresponding length adjustments to the support members and frame members. As a result, it is possible to assemble a platform of any required width and front to back depth from these standard components.

Various modifications of the present invention will be apparent to those skilled in the art without departing from the scope of the invention.

We claim:

1. In a load elevator for raising and lowering a load with respect to the bed of a truck, the improvement of a light-weight elevator platform comprising:
   (a) a plurality of light-weight floor boards, each having oppositely disposed side edges and oppositely disposed ends,
   (b) a frame having oppositely disposed first frame members and oppositely disposed second frame members connected to one another to define a rectangular-shaped floor board enclosure, said frame members each having a side face which is directed inwardly of the enclosure,
   (c) a plurality of support rails each having oppositely disposed side faces and oppositely disposed ends,
   (d) means for releasably securing the ends of said support rails to the first frame member to releasably retain the support rails in a position extending between the first frame members in a spaced parallel relationship to the second frame members, (e) a mounting channel at said side face of each second frame member and at each side face of each support rail, said mounting channels each having upper and lower walls forming seats releasably retaining a marginal side edge portion of one of the floor boards to retain one floor board along the length between each support rail and between the second frame members and an adjacent support rail, said floor boards and support rails being otherwise free of attachment to one another so as to be readily assembled and disassembled by releasing said means for releasably securing the ends of the support rails to the first frame members.

2. A load elevator as claimed in claim 1 wherein the means for releasably securing the ends of said support rails to the first frame members comprised a mounting channel formed in the side face of each first frame member, said channel being proportioned to receive an end of each support rail in a close fitting relationship.

3. An elevator platform as claimed in claim 1, wherein at least one of said second frame members is a detachable frame member which is releasably secured to said first frame members, so as to permit said detachable frame member to be secured to the first frame members after all of the floor boards and support rails are operably mounted in the enclosure to facilitate the positioning of the marginal edge of the channel of the support rail which is located adjacent the detachable frame member and the mounting channel of the detachable frame member.

4. An elevator platform as claimed in claim 1, wherein the frame members have an upper face and a lower face and a predetermined thickness between the upper and lower face, said floor boards having a thickness which is less than that of the frame members, said frame members having flanges which project laterally therefrom which contribute substantially to the section modules of the frame member and define opposite side walls of said mounting channels.

5. A load elevator platform as claimed in claim 1 wherein said means for releasably securing the ends of the support rails to the first frame members comprises; a mounting bolt that has a first end pivotally mounted at an end of said support rails and an elongated body portion that projects from the end of said one support rail through an adjacent first frame member, and a nut threadedly mounted on said elongated body and bearing against said first frame member to thereby releasably secure the ends of the support rails to the first frame members.

6. In a load elevator for raising and lowering a load with respect to the bed of a truck, the improvement of a light-weight elevator platform comprising:
(a) a plurality of light-weight floor boards, each having oppositely disposed side edges and oppositely disposed ends,
(b) a frame having oppositely disposed first frame members and oppositely disposed second frame members connected to one another to define a rectangular-shaped floor board enclosure, said frame members each having a side face which is directed inwardly of the enclosure,
(c) a plurality of support rails each having oppositely disposed side faces and oppositely disposed ends,
(d) means for releasably securing the ends of said support rails to the first frame member to releasably retain the support rails in a position extending between the first frame members in a spaced parallel relationship to the second frame members,
(e) a mounting channel formed along each side face of each support rail and the side faces of the second frame members, said mounting channel being proportioned to receive the marginal side edge portion of one of the floor boards in a close-fitting relationship to support one floor board between each support rail and between the second frame members and an adjacent support rail,
(f) said floor boards each comprising a one-piece metal body which has a floor panel portion and a stiffening rib portion, the rib portion projecting downwardly from the centre of the width of the floor panel, the floor panel portion also having marginal edge portions which are downwardly and outwardly inclined so as to have an effective thickness such that the marginal edge portions will fit in a close-fitting relationship within said mounting channels as aforesaid to releasably retain said floor boards therein, said stiffening rib projecting a substantial distance below the marginal edge portions of the floor panel to add rigidity to the floor panel.

7. An elevator platform as claimed in claim 6, wherein said floor boards have a generally T-shaped cross-sectional configuration.

8. In a load elevator for raising and lowering a load with respect to the bed of a truck, the improvement of a light-weight elevator platform comprising:
(a) a plurality of light-weight floor boards, each having oppositely disposed side edges and oppositely disposed ends and a predetermined thickness,
(b) a frame having oppositely disposed first frame members and oppositely disposed second frame members connected to one another to define a rectangular-shaped floor board enclosure, said frame members each having a side face which is directed inwardly of the enclosure,
(c) a plurality of support rails each having oppositely disposed side faces and oppositely disposed ends, an upper face and a lower face and a predetermined thickness between the upper and lower faces, the thickness of the support rails being substantially greater than that of the floor boards, a mounting channel at said side face of each second frame member and at each side face of each support rail releasably retaining a marginal side edge portion of one of the floor boards to support one floor board between each support rail and between the second frame members and an adjacent support rail, each support rail having a central rib that projects below the mounting channels of said support rail to the lower face thereof to rigidify said support rails,
(d) means for releasably securing the ends of said support rails to the first frame member to releasably retain the support rails in a position extending between the first frame members in a spaced parallel relationship to the second frame members.

* * * * *